(12) United States Patent
Holland et al.

(10) Patent No.: US 6,572,837 B1
(45) Date of Patent: Jun. 3, 2003

(54) FUEL PROCESSING SYSTEM

(75) Inventors: Robert Holland, Richmond (CA);
Gary Schubak, Vancouver (CA); Mark Bradley, North Vancouver (CA); Kevin O'Connor, Maple Ridge (CA); Brant Peppley, Kingston (CA)

(73) Assignee: Ballard Power Systems Inc., Burnaby (CA)

( * ) Notice: Subject to any disclaimer, the term of this patent is extended or adjusted under 35 U.S.C. 154(b) by 60 days.

(21) Appl. No.: 09/619,204

(22) Filed: Jul. 19, 2000

(51) Int. Cl.[7] .............................. C01B 3/02; C01B 3/24; C01B 3/26; C01B 3/12; C01B 3/16

(52) U.S. Cl. ................... 423/648.1; 423/650; 423/652; 423/655; 423/656; 429/17; 429/19

(58) Field of Search ............................. 423/648.1, 650, 423/652, 655, 656; 429/17, 19

(56) References Cited

U.S. PATENT DOCUMENTS

| | | | |
|---|---|---|---|
| 3,251,652 A | 5/1966 | Pfefferle | 23/213 |
| 4,494,965 A | 1/1985 | Ali-Khan et al. | 55/16 |
| 4,810,485 A | 3/1989 | Marianowski et al. | 423/648.1 |
| 5,861,137 A | 1/1999 | Edlund | 423/652 |
| 5,897,970 A | 4/1999 | Isomura et al. | 429/9 |
| 5,938,800 A | 8/1999 | Verrill et al. | 48/127.9 |
| 5,958,218 A | 9/1999 | Hunter et al. | 208/78 |
| 5,993,619 A | 11/1999 | Bloomfield et al. | 204/242 |
| 5,997,594 A | 12/1999 | Edlund et al. | 48/76 |
| 6,063,515 A * | 5/2000 | Epp et al. | 429/17 |
| 6,066,307 A * | 5/2000 | Keskar et al. | 423/648.1 |
| 6,348,278 B1 * | 2/2002 | LaPierre et al. | 429/17 |

FOREIGN PATENT DOCUMENTS

| | | |
|---|---|---|
| EP | 0 945 174 | 9/1999 |
| GB | 972 166 | 10/1964 |
| GB | 2 283 235 | 5/1995 |
| JP | 4-285691 | 10/1992 |
| JP | 7-112111 | 5/1995 |
| JP | 7-315802 | 12/1995 |
| JP | 8-78039 | 3/1996 |
| JP | 11-71101 | 3/1999 |
| WO | WO 97/43796 | 11/1997 |
| WO | WO 98/13125 | 4/1998 |
| WO | WO 99/46032 | 9/1999 |
| WO | WO 99/54948 | 10/1999 |
| WO | WO 99/55803 | 11/1999 |
| WO | WO 99/61368 | 12/1999 |
| WO | WO 99/65097 | 12/1999 |

* cited by examiner

Primary Examiner—Wayne A. Langel
(74) Attorney, Agent, or Firm—McAndrews, Held & Malloy, Ltd.

(57) ABSTRACT

A method and apparatus for processing a hydrocarbon fuel comprises: a primary fuel processing reactor for converting a feed stream to a first reformate stream comprising hydrogen; a first hydrogen separator located downstream of the primary fuel processing reactor and fluidly connected thereto for receiving the first reformate stream, the first separator comprising a first membrane for separating the first reformate stream into a first hydrogen-rich stream and a first retentate stream; and a secondary fuel processing reactor fluidly connected to the first separator for receiving and converting the first retentate stream to a second reformate stream comprising hydrogen. A fuel cell power generation system includes the present apparatus and a fuel cell stack fluidly connected thereto for receiving hydrogen-rich streams therefrom.

17 Claims, 2 Drawing Sheets

FUEL PROCESSING SYSTEM

FIELD OF THE INVENTION

The present invention relates to methods and apparatus for producing substantially pure hydrogen from a hydrocarbon fuel, and in particular, to an apparatus comprising a plurality of fuel processing reactors and hydrogen separation membrane units connected in series.

BACKGROUND OF THE INVENTION

The search for alternative power sources has focused attention on the use of electrochemical fuel cells to generate electrical power. Unlike conventional fossil fuel power sources, fuel cells are capable of generating electrical power from a fuel stream and an oxidant stream without producing substantial amounts of undesirable by-products, such as sulfides, nitrogen oxides and carbon monoxide. However, the commercial viability of fuel cell systems will benefit from the ability to efficiently and cleanly convert conventional hydrocarbon fuel sources, such as, for example, gasoline, diesel, natural gas, ethane, butane, light distillates, dimethyl ether, methanol, ethanol, propane, naphtha, kerosene, and combinations thereof, to a hydrogen-rich gas stream with increased reliability and decreased cost. The conversion of such fuel sources to a hydrogen-rich gas stream is also important for other industrial processes, as well. Several technologies are available for converting such fuels to hydrogen-rich gas streams.

Steam reformers convert hydrocarbons to reformate gas streams that contain hydrogen. Hydrocarbon feedstock and steam are reacted in reactors filled with catalyst (typically nickel-, copper- or noble metal-based), and hydrogen, carbon dioxide ($CO_2$), and carbon monoxide ($CO$) are produced. For example, the following principal reactions occur in the steam reforming of methane (and natural gas):

$$CH_4 + H_2O \rightleftharpoons CO + 3H_2 \quad \text{(I)}$$

$$CO + H_2O \rightleftharpoons CO_2 + H_2$$

$$\overline{CH_4 + 2H_2O \rightleftharpoons CO_2 + 4H_2}$$

The overall reaction (I) is highly endothermic, and is normally carried out at elevated catalyst temperatures in the range from about 650° C. to about 875° C. Such elevated temperatures are typically generated by the heat of combustion from a burner incorporated in the fuel processing reactor. Steam reforming is adversely affected by sulfur and/or other contaminants in the feedstock. Accordingly, fuel feed purification may be required prior to steam reforming.

Partial oxidation systems are based on substoichiometric combustion to achieve the temperatures necessary to reform the hydrocarbon feedstock. Feedstock and oxidant (oxygen or air, for example) are reacted to form hydrogen and CO. Taking methane as an example, the process is based mainly on the exothermic partial oxidation of the hydrocarbon.

$$2CH_4 + O_2 \rightarrow 2CO + 4H_2 \quad \text{(II)}$$

Other reactions may also occur, including endothermic cracking and/or pyrolysis, and endothermic reforming with carbon dioxide. Combustion of the feedstock, according to the following reaction, is minimized:

$$CH_4 + 2O_2 \rightarrow CO_2 + 2H_2O \quad \text{(III)}$$

Partial oxidation is generally performed at high temperatures (1200–1650° C.). The heat required to drive the reactions is typically supplied by oxidizing a fraction of the fuel.

Catalytic partial oxidation systems employ catalysts to accelerate the reforming reactions at lower temperatures. The desirable result can be soot-free operation, since soot is a common problem with non-catalytic partial oxidation approaches, and improved conversion efficiencies from smaller and lighter equipment. However, common catalysts are susceptible to coking by feedstocks that are high in aromatic content at the low steam-to-carbon ratios typically employed.

Autothermal reforming is an approach that combines catalytic partial oxidation and steam reforming. A significant advantage of autothermal reforming technology is that the exothermic combustion reaction (II or III) is used to drive the endothermic reforming reaction (I).

More recently, a plasma reformer process has been developed that employs an electric arc to generate very high temperatures for reforming the fuel. The high temperature conditions avoid the need for catalysts.

In addition to the fuel processing step, other processing steps are generally performed to reduce the sulfur and/or CO content of the fuel gas to meet fuel cell requirements. Absorbent beds may be utilized to remove sulfur-containing compounds from the fuel gas, for example. A water gas shift reactor ("shift reactor") is often employed to reduce the CO concentration in the fuel gas in order to avoid poisoning of the catalyst employed in the fuel cells and to produce additional hydrogen fuel. In the shift reactor, CO is combined with water in the presence of a catalyst to yield carbon dioxide and hydrogen according to the following reaction:

$$CO + H_2O \rightleftharpoons CO_2 + H_2 \quad \text{(IV)}$$

In many instances, the reformate stream exiting the shift reactor is often passed through a selective oxidizer, to further reduce the concentration of CO present in the stream.

With respect to reliability and cost, conventional reformers have some disadvantages with respect to fuel cell use. For example, in vehicular applications in particular, conventional reformers tend to be quite large, which impacts material costs and undesirably increases the size and weight of the fuel cell power generation system, as a whole. Several approaches have been used in an effort to reduce the size and weight of hydrocarbon reforming systems without undesirable loss of performance.

For example, a conventional reformer can be followed by a hydrogen separation unit. A hydrogen separation unit employs a hydrogen-permeable membrane material to separate essentially pure hydrogen from the reformed fuel gas ("reformate"). Typically, these membranes are made of palladium or palladium alloy films supported by porous ceramic substrates, but may be made of other materials with high selectivity and high permeability for hydrogen. The reformer is typically operated at a relatively high pressure (for example, 20 to 35 barg) to provide a good hydrogen partial pressure on the high-pressure side of the palladium membrane. However, the amount of feedstock that can be reformed is limited by pressure-related equilibrium considerations. For example, the conversion of methanol to hydrogen is limited to about 92% at 35 barg. As well, the palladium membrane is limited as to the amount of hydrogen it can produce by such factors as temperature, the hydrogen partial pressure across the membrane, and equilibrium considerations. A typical reformer/palladium system produces in the range of 75% fuel efficiency at optimum conditions.

One approach to increasing the fuel efficiency of such a system is to recycle the retentate from the palladium unit back to the reformer and recover the unreformed fuel and/or hydrogen. However, such recycling systems suffer from several disadvantages. First, they generally include a compressor for the recycling loop, which introduces a parasitic load into the system and also increases its size, cost, and complexity. Second, recycling the retentate effectively dilutes the feedstock. The introduction of diluent gases increases the mass flows and thereby increases the size and cost of the reformer if hydrogen production capacity is to be maintained. Third, the retentate will be enriched in CO (and possibly hydrogen), as compared to the feedstock. As a result, the equilibrium conditions in the mixed feedstock/retentate will be less favorable with respect to hydrogen formation, by LeChatelier's principle. Accordingly, such recycling systems are less than optimal.

A similar approach employs staged hydrogen separation units downstream of the fuel processing reactor. The amount of hydrogen recoverable in a first palladium membrane unit, for example, is limited by the hydrogen partial pressure in the reformate stream and the hydrogen partial pressure differential across the membrane. A second palladium membrane unit is employed to recover some of the hydrogen in the retentate from the first unit. While equilibrium conditions in the second unit favor further hydrogen recovery, the hydrogen partial pressure of the retentate stream may be less than favorable.

Another approach is to incorporate a reformer and a hydrogen separation membrane together into a "membrane reactor". Such an integral arrangement enhances both the reforming and separating functions. Hydrogen formed in the reforming reaction can be continually removed by the separation membrane, thereby creating equilibrium conditions in the reformer favoring hydrogen formation. The formation of hydrogen on one side of the membrane also assists to maintain a hydrogen partial pressure favoring separation. However, this approach has rarely been successful in practice. It greatly increases the complexity of design and also greatly increases the complexity of maintenance of the unit.

Accordingly, it would be desirable to have a hydrocarbon fuel reforming system of relatively simple design, capable of high hydrogen recovery rates, and of adequate reliability, size, weight and cost for use in various industrial applications, including fuel cell applications. Embodiments of the present system address one or more of these concerns.

SUMMARY OF THE INVENTION

A fuel processing system is provided comprising:
(a) a primary fuel processing reactor for converting a feed stream to a first reformate stream comprising hydrogen;
(b) a first hydrogen separator located downstream of the primary fuel processing reactor and fluidly connected thereto for receiving the first reformate stream, the first separator comprising a first membrane for separating the first reformate stream into a first hydrogen-rich stream and a first retentate stream; and
(c) a secondary fuel processing reactor fluidly connected to the first separator for receiving and converting the first retentate stream to a second reformate stream comprising hydrogen.

In a preferred embodiment of the present fuel processing system, the first hydrogen separator is fluidly connected to the secondary fuel processing reactor for receiving the second reformate stream in addition to or in combination with the first reformate stream. The second reformate stream may be introduced into the first reformate stream via a compressor or an ejector.

Alternatively, the fuel processing system may further comprise a second hydrogen separator located downstream of the secondary fuel processing reactor and fluidly connected thereto for receiving the second reformate stream, the second separator comprising a second membrane for separating the second reformate stream into a second hydrogen-rich stream and a second retentate stream.

In the present fuel processing system, the primary fuel processing reactor may comprise a steam reformer, partial oxidation reformer, catalytic partial oxidation reformer, autothermal reformer, or a plasma reformer, for example. The secondary fuel processing reactor may comprise any of the foregoing or may comprise a shift reactor. If the feed stream comprises synthesis gas or a reformate stream from a high-temperature reformer, both the primary and secondary fuel processing reactors may comprise shift reactors. In a preferred embodiment, the primary fuel processing reactor is a steam reformer and the secondary reformer is a steam reformer or a shift reactor.

The present fuel processing system may further comprise a fuel supply for supplying fuel to the primary fuel processing reactor, an oxidant supply for supplying oxidant to at least one of the primary and secondary fuel processing reactors, and/or a water supply for supplying water vapor to at least one of the primary and secondary fuel processing reactors. The fuel processing system may also further comprise a heating device for heating the second reformate stream to a temperature within a predetermined temperature range.

The first and second membranes found in the first and second hydrogen separators, respectively, may be independently selected from the group consisting of palladium membranes, palladium alloy membranes, platinum membranes, platinum alloy membranes, titanium alloy membranes, ceramic membranes, zeolite molecular sieve membranes, carbon molecular sieve membranes, inorganic poly-acid membranes, and composite membranes thereof. They may be supported, and may be constructed as plate-and-frame, spiral wound, or hollow fiber modules, if desired. The membranes of the first and second hydrogen separators may be the same or different.

The feed stream may comprise a fuel selected from the group consisting of gasoline, diesel, natural gas, ethane, butane, light distillates, dimethyl ether, methanol, ethanol, propane, naphtha, kerosene, and combinations thereof.

A fuel cell power generation system is also provided. In one embodiment the fuel cell power generation system comprises:
(a) a primary fuel processing reactor for converting a feed stream to a first reformate stream comprising hydrogen;
(b) a first hydrogen separator located downstream of the primary fuel processing reactor and fluidly connected thereto for receiving the first reformate stream, the first separator comprising a first membrane for separating the first reformate stream into a first hydrogen-rich stream and a first retentate stream;
(c) a secondary fuel processing reactor fluidly connected to the first separator for receiving and converting the first retentate stream to a second reformate stream comprising hydrogen; and a fuel cell stack comprising at least one fuel cell fluidly connected to receive the first hydrogen-rich stream from the fuel processing system.

Another embodiment of the present fuel cell power generation system further comprises a second hydrogen separator located downstream of the secondary fuel processing reactor and fluidly connected thereto for receiving the second reformate stream, the second separator comprising a second membrane for separating the second reformate stream into a second hydrogen-rich stream and a second retentate stream, and the fuel cell stack is connected to receive both first and second hydrogen-rich streams from the fuel processing system. In either embodiment, the at least one fuel cell may be a solid polymer electrolyte fuel cell.

A fuel processing method is also provided, comprising the sequential steps:
(a) supplying a feed stream to a primary fuel processing reactor;
(b) processing the feed stream in the primary fuel processing reactor to produce a first reformate stream comprising hydrogen;
(c) supplying the first reformate stream to a hydrogen separator and separating the first reformate stream therein into a first hydrogen-rich stream and a first retentate stream;
(d) supplying the first retentate stream to a secondary fuel processing reactor and processing the first retentate stream therein to produce a second reformate stream comprising hydrogen; and
(e) supplying the second reformate stream to a hydrogen separator and separating the second reformate stream therein into a second hydrogen-rich stream and a second retentate stream.

In this method, the first and second reformate streams may be supplied to the same hydrogen separator, or the first reformate stream may be supplied to a first hydrogen separator in step (c), and the second reformate stream may be supplied to a second hydrogen separator in step (e).

In the present method, the primary fuel processing reactor may comprise a steam reformer, partial oxidation reformer, catalytic partial oxidation reformer, autothermal reformer, or plasma reformer, for example. The secondary fuel processing reactor may comprise any of the foregoing or may comprise a shift reactor. Where the feed stream comprises synthesis gas or a reformate stream from a high-temperature reformer, both the primary and secondary fuel processing reactors may be shift reactors. In a preferred embodiment, the primary fuel processing reactor is a steam reformer and the secondary reformer is a steam reformer or a shift reactor.

The first and second membranes found in the first and second hydrogen separators may be independently selected from the group consisting of palladium membranes, palladium alloy membranes, platinum membranes, platinum alloy membranes, titanium alloy membranes, ceramic membranes, zeolite molecular sieve membranes, carbon molecular sieve membranes, inorganic poly-acid membranes, and composite membranes thereof. They may be supported, and may be constructed as plate-and-frame, spiral wound, or hollow fiber modules, if desired. The first and second membranes may be the same or different from each other.

The feed stream may comprise a fuel selected from the group consisting of gasoline, diesel, natural gas, ethane, butane, light distillates, dimethyl ether, methanol, ethanol, propane, naphtha, kerosene, and combinations thereof.

The present method may further comprise supplying water vapor, oxidant, or both, to the primary fuel processing reactor, the secondary fuel processing reactor, or both, as desired. In addition, the method may further comprise heating the second reformate stream to a temperature within a predetermined temperature range upstream of the hydrogen separator.

Although these embodiments of the apparatus and methods are described herein as comprising two fuel processing reactors and one or two hydrogen separators, additional reactors and separators may be included. For example, a third fuel processing reactor may be located downstream of the second hydrogen separator and fluidly connected thereto for receiving and converting the second retentate stream to a third reformate stream comprising hydrogen.

DETAILED DESCRIPTION OF PREFERRED EMBODIMENT(S)

As used in this description and in the appended claims, hydrocarbon fuel means gaseous or liquid fuels comprising aliphatic hydrocarbons and oxygenated derivatives thereof, and may further comprise aromatic hydrocarbons and oxygenated derivatives thereof. Reformate means the gas stream comprising hydrogen produced from a hydrocarbon fuel by a fuel processing reactor, including but not limited to steam reformers, partial oxidation reformers, catalytic partial oxidation reformers, autothermal reformers, plasma reformers, and shift reactors. Oxidant means substantially pure oxygen, or a fluid stream comprising oxygen, including air. Synthesis gas means a gas mixture comprising carbon monoxide and hydrogen such as that may be used as a feedstock for making hydrocarbon compounds. As used herein, when two components are fluidly connected to one another, there may be other components in between them, and the other components may effect the fluid connection but not eliminate it altogether.

The primary fuel processing reactor may, but need not, convert most or substantially all of the feed stream to a reformate stream. The primary fuel processing reactor will generally convert more (or a greater percentage) of the feed stream than will the secondary fuel processing reactor, although in certain embodiments, the secondary fuel processing reactor will convert a greater volume or percentage to hydrogen. Similarly, the primary hydrogen separator may, but need not; separate volume or percentage of hydrogen from reformate than does a secondary hydrogen separator, if present.

The present method and apparatus employ fuel processing reactors and hydrogen separation units in stages in order to produce hydrogen from a fuel. Generally, a first-stage fuel processing reactor converts the fuel into a reformate stream, which is provided to a first-stage hydrogen separation device. The reformate stream is separated into a hydrogen-rich stream ("permeate") and a hydrogen-depleted stream ("retentate"). Substantially pure hydrogen will generally permeate through the membrane of the hydrogen separator, while the hydrogen-depleted stream generally does not permeate the membrane and remains on the original side of the membrane. The first-stage hydrogen separation device typically removes about 40–60% of the hydrogen from the reformate stream. The hydrogen-depleted retentate is then sent to a second-stage fuel processing reactor where it is reformed into additional hydrogen. Lowering the hydrogen concentration in the first-stage retentate may shift the equilibrium of the reforming reaction in the second-stage fuel processing reactor in favor of further hydrogen production, thus increasing the overall fuel conversion efficiency. This, in turn, may increase the driving force and favor the recovery of additional hydrogen from a second-stage hydrogen separation device. More than two stages may be employed to further increase the recovery of hydrogen from the fuel.

Figure 1:
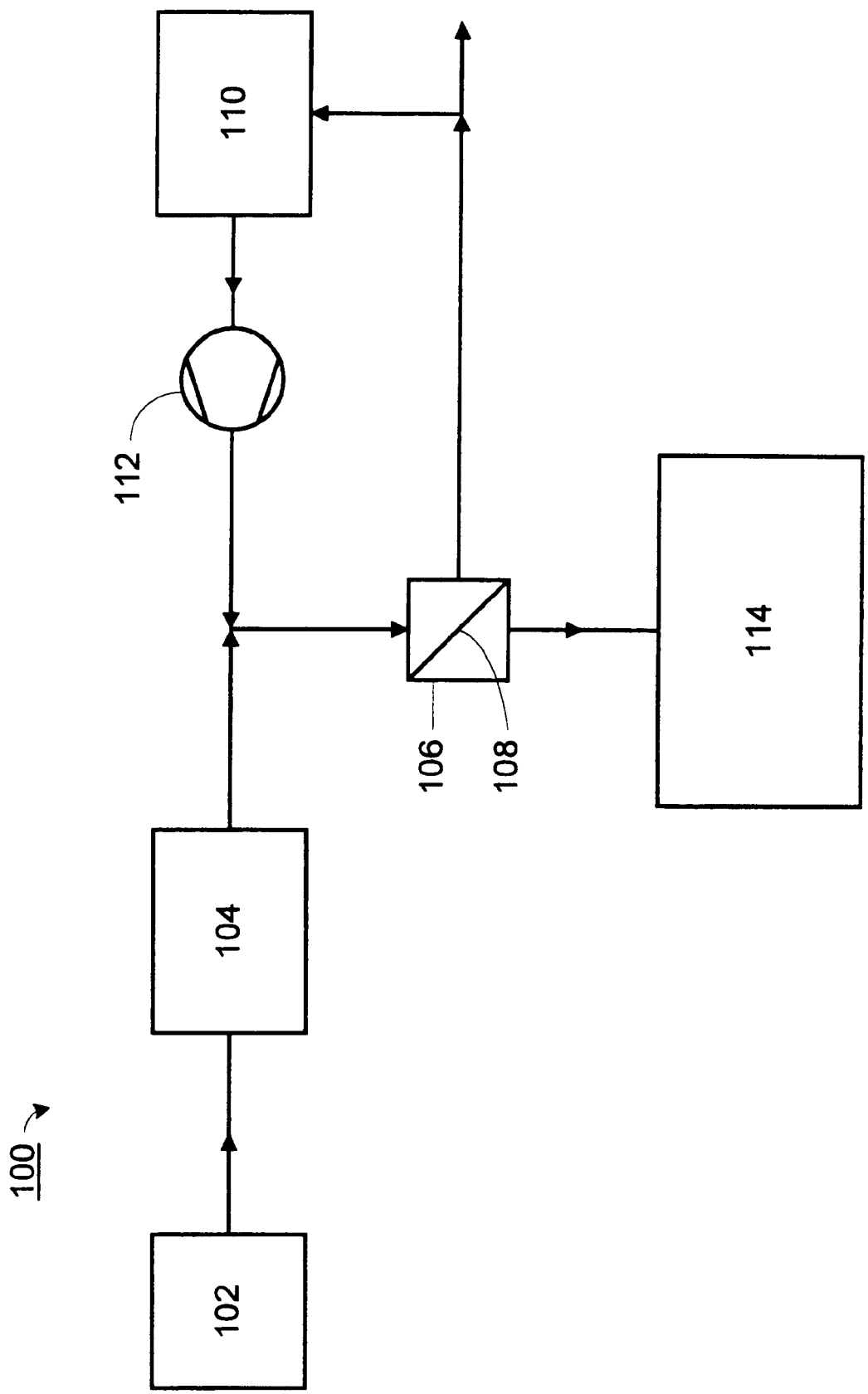
FIG. 1 is a schematic block diagram of a preferred embodiment of the present method and apparatus.

FIG. 1 is a schematic block diagram of a preferred embodiment of the present method and apparatus. In fuel processing system 100, a vaporized feed stream from feed source 102 is fed to primary fuel processing reactor 104. Primary fuel processing reactor 104 converts the feed stream to a first hydrogen-rich reformate stream. The reformate stream is then fed to hydrogen separation device 106, where it is separated into a hydrogen-rich stream and a retentate stream by membrane 108. A portion of the retentate stream is then fed to secondary fuel processing reactor 110, where it is converted to a second reformate stream comprising hydrogen. The reformate stream from secondary fuel processing reactor 110 is pressurized in compressor 112 and then introduced into the first reformate stream supplied to hydrogen separation device 106. Alternatively, an ejector could be used instead of compressor 112 to pressurize the second reformate stream prior to introduction into hydrogen separation device 106. The pressurized reformate stream from secondary fuel processing reactor 110 could also be introduced into hydrogen separation device 106 separately from the reformate stream from fuel processing reactor 104. In any case, hydrogen separation device 106 separates the reformate stream of fuel processing reactors 104, 110 into a hydrogen-rich stream that preferably comprises substantially pure hydrogen. A portion of the retentate stream is typically diverted and used to fuel a (catalytic) burner (not shown) for fuel processing reactor 104, fuel processing reactor 110, or both. The hydrogen-rich stream from hydrogen separation device 106 is supplied to unit 114. Unit 114 may comprise a storage tank or downstream equipment such as, for example, a fuel cell stack for generating electricity from the hydrogen-rich stream as part of a fuel cell power generation system. For example, the method and apparatus may employ a fuel cell stack such as that disclosed in U.S. Pat. No. 5,484,666, which is incorporated by reference herein.

Figure 2:
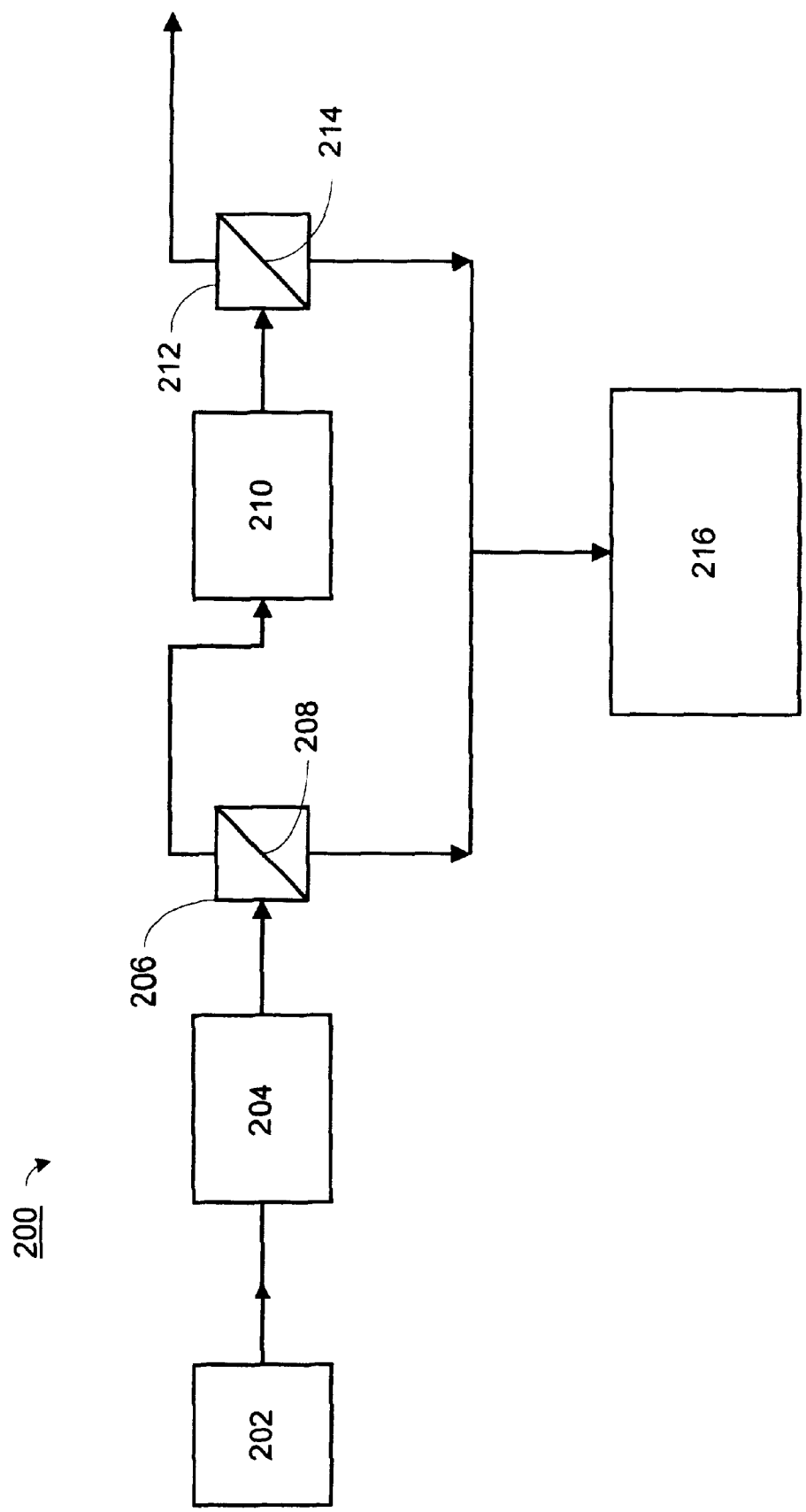
FIG. 2 is a schematic block diagram of another embodiment of the present method and apparatus.

FIG. 2 is a schematic block diagram of another embodiment of the present method and apparatus. In fuel processing system 200, a vaporized feed stream from feed source 202 is fed to primary fuel processing reactor 204. Primary fuel processing reactor 204 converts the feed stream to a first reformate stream comprising hydrogen. The reformate stream is then fed to first hydrogen separation device 206, where it is separated into a hydrogen-rich stream, preferably a substantially pure hydrogen stream, and a retentate stream by membrane 208. The retentate stream is then fed to secondary fuel processing reactor 210, where it is converted to a second reformate stream comprising hydrogen. The reformate stream from secondary fuel processing reactor 210 is then fed to second hydrogen separation device 212, where it is separated into a hydrogen-rich stream, preferably a substantially pure hydrogen stream, and a retentate stream by membrane 214. The retentate stream from hydrogen separation device 212 may be exhausted: alternatively, all or a portion of it may be used to fuel a burner (not shown) for fuel processing reactor 204, fuel processing reactor 210, or both. The hydrogen-rich streams from hydrogen separation units 206, 212 are supplied to unit 216. Unit 216 may comprise a storage tank or downstream equipment such as, for example, a fuel cell stack for generating electricity from the hydrogen-rich stream as part of a fuel cell power generation system.

By supplying hydrogen-depleted retentate to the secondary fuel processing reactor, the equilibrium of the reforming reaction is shifted in favor of the production of more hydrogen. Thus, reaction conditions in the secondary reactor may be more favorable to hydrogen production relative to a fuel processing reactor where recycled retentate is mixed with fuel. More favorable reaction conditions, in turn, may result in greater efficiency compared to such fuel processing systems. Similarly, the reformate streams may have higher hydrogen partial pressures relative to systems employing retentate recycling or separation units in series, and the hydrogen separation devices may operate at higher efficiency as a result. The present method and apparatus is also simpler than palladium membrane reactors and may be less costly to produce and maintain.

Any suitable hydrocarbon fuel can be used as the feed stream. Suitable such fuels include gasoline, diesel, natural gas, ethane, butane, light distillates, dimethyl ether, methanol, ethanol, propane, naphtha, kerosene, and combinations thereof, for example, and may also include synthesis gas or the reformate from a high-temperature reformer.

The present method and apparatus may employ any fuel processing reactor capable of converting a hydrocarbon fuel stream to a reformate stream comprising hydrogen. For example, steam reformers, partial oxidation reformers, catalytic partial oxidation reformers, autothermal reformers (including electrochemical autothermal reformers (EATR)), plasma reformers, and shift reactors can be used. The fuel processing reactors can operate at high or low temperature, pressure, or both, depending on system characteristics.

Where the present method and apparatus are part of a stand-alone fuel processing system, the primary fuel processing reactor is a reformer such as, for example, a steam reformer, partial oxidation reformer, catalytic partial oxidation reformer, autothermal reformer, or plasma reformer. The other fuel processing reactor(s) may alternatively comprise a shift reactor. Subject to the foregoing, the fuel processing reactors may be of the same type or different. The same is true where the present method and apparatus is part of a larger system. For example, the present method and apparatus may be used for processing synthesis gas into substantially pure hydrogen, or as part of a fuel processing system downstream of a high-temperature reformer (such as in natural gas reforming). In such circumstances, the fuel processing reactors may be shift reactors or other similar devices. For fuel cell power generation applications, a preferred fuel processing system comprises two steam reformers or a primary steam reformer and a secondary shift reactor.

The hydrogen separation membrane may comprise: a metal membrane (for example, palladium, palladium alloy, or titanium alloy membrane); a polymeric material (for example, porous or microporous polyaramides, polyimides, polyketones, polysulfones, siloxane- and silane-based polymers, and cellulose acetate-based polymers); ceramic membranes (for example, porous silica membranes, porous or dense metal oxide membranes); zeolite molecular sieves; carbon molecular sieves; and inorganic poly-acids (for example, poly-antimonic acids and polyphosphates); and composite membranes thereof. The membranes may be supported or unsupported. They may be flat films or films of various other shapes, such as cylinders, for example. The membranes may comprise modules such as, for example, plate-and-frame, spiral wound, or hollow fiber modules. In the preferred embodiment, the hydrogen separation membranes of the first and second hydrogen separation devices may be of the same type or different. Palladium and palladium alloy membranes are more preferred.

As will be understood by persons skilled in the art, the present method and apparatus may further comprise other steps/components depending on the particular system configuration employed. Factors to be considered include the hydrocarbon fuel, fuel processing reactor design, and hydrogen separation membrane operating conditions. For example, if the fuel used is other than an alcohol or ether, an upstream pre-treatment step (for example, desulfurization) will probably be necessary prior to any catalytic fuel processing reactor step to remove any catalyst poisons present in the fuel. In addition, it may also be desirable to include an upstream pre-reforming step prior to a first reforming step where higher molecular weight fuels are employed.

Depending on the choice of fuel processing reactors, the present method and apparatus may further comprise a water source for supplying steam, an oxidant, or both, to the fuel processing reactors depending on processing or reactor requirements. For example, steam reformers require a source of steam, partial oxidation reformers require an oxidant source, and autothermal reactors typically require both. In fuel cell power generation applications, oxidant may be supplied from the stack oxidant supply or from the cathode exhaust, for example. Similarly, water may be obtained from a stack water supply, or reaction product water may be used. Depending on the relative operating temperatures of the fuel processing reactors, heat exchange elements may also be included, if desired. This may increase efficiency of the system where, for example, the heat from an exothermic fuel processing reactor could be supplied to an endothermic fuel processing reactor.

The choice of hydrogen separation device, and in particular, the hydrogen separation membrane, also influences systems design. The suitability of a particular membrane may depend on such factors as, for example, process feed compositions, process feed pressures, process temperatures and/or temperature cycles, and pressure differentials across the membrane. For example, palladium and palladium alloy membranes operate more efficiently at higher temperatures. Where an endothermic fuel processing reactor, such as a steam reformer, for example, is employed, it may be desirable to include a heating device upstream of the hydrogen separation device to heat the incoming reformate stream to within the optimal operating temperature range of the membrane. Suitable such heating devices include burners, electrical heaters, and oil bath heaters, for example. As another example, hydrogen separation membranes also have an optimal pressure range for hydrogen separation. The present method and apparatus may further include means for pressurizing the reformate streams supplied to the hydrogen separation device(s), if desired. Preferably, the system pressure chosen will correspond to the optimal operating pressure of the hydrogen separation membranes employed, at least within the hydrogen separation units themselves.

While the foregoing factors influencing system design have been discussed separately, those skilled in the art will recognize that they are inter-dependent and should be considered in relation to each other. In particular, system pressure and temperature parameters should be chosen to optimize the fuel processing reactor reactions and hydrogen separation efficiencies.

The present method and apparatus is intended to permit increased recovery of hydrogen relative to prior art systems employing a single fuel processing reactor. At the same time, they embody a simple design that may be simpler to maintain and repair than current palladium membrane reactors. Further, they may also provide for the ability to separately optimize fuel processing reactors and hydrogen separation devices for each stage. The following example is for purposes of illustration and is not intended to limit the claims.

EXAMPLE 1

A fuel processing system was assembled using a Ballard Power Systems prototype design 50 kW steam reformer, having a modified tube and shell heat exchanger with commercial low-temperature shift catalyst inside tubes (9 L of BASF R3-12 catalyst), as the primary reformer, and first and second palladium membrane hydrogen separation units. The hydrogen separation units were also prototypes comprising planar palladium separation membranes in a plate-and-frame construction, and were rated at 25 kW each.

The system was used to reform methanol. The primary steam reformer was operated at 34.5–36.2 barg inlet pressure, steam to carbon ratio of 1.4 to 1, and a 275–285° C. reformer outlet temperature. Reformate was passed through the first and second palladium separation units in series. The separation units were operated at about 34.5 barg inlet pressure and 285–300° C. inlet temperature. Retentate outlet pressure was about 33.8–35.2 barg and the permeate outlet pressure was 2.8–3.4 barg. The retentate from the first palladium separation unit is fed to the inlet of the second palladium separation unit, and the retentate from the second unit is supplied as fuel to the primary reformer burner—additional methanol is also used to supplement the retentate stream supplied to the burner. Data set forth in Table 1 was compiled from this system.

The fuel processing system was then modified according to the present method and apparatus by installing a secondary steam reformer between the two palladium separation units. The secondary steam reformer is another Ballard Power Systems prototype design, with a modified tubular reactor and oil-jacket heating, and containing commercial low-temperature shift catalyst inside the reactor (2 L of BASF R3-12 catalyst). Otherwise, operating conditions of both systems were the same.

Both systems were operated at 40% of their nominal reformer pump settings and the hydrogen output of both systems was measured using a Teledyne-Hastings 200-series mass flow meter calibrated to 500 SLPM of hydrogen. The flow rate of hydrogen produced by each system was measured, as was the flow rate of air supplied to the burner of the primary reformer. In addition, the output of the primary burner methanol pump was measured as a percentage of maximum output. The results are compiled in Table 1.

TABLE 1

| Secondary Reformer | Reformer Pump Output (% Max) | $H_2$ Flow (SLPM) | Burner Pump Output (% Max) | Burner Oxygen Flow (SLPM) |
|---|---|---|---|---|
| Absent | 40 | 250 | 9.4 | 90 |
| Present | 40 | 280 | 12.4 | 95 |
| Percent Increase | 0% | 12% | 31% | 6% |

The data indicates that for the system employing the present method and apparatus the hydrogen flow, and therefore the system output, increased by 12% relative to the first system described above. The data also indicates that about 30% more burner methanol was required, partly to compensate for the lower fuel flow in the retentate. However, this increase corresponds to an increase in total methanol flow of about 6%. The burner oxygen flow increase is of a similar magnitude. Thus, the data indicates that the present method and apparatus may result in a significant increase in hydrogen production without the need for costly and complicated palladium membrane reactors.

While particular elements, embodiments and applications of the present invention have been shown and described, it will be understood, of course, that the invention is not limited thereto since modifications may be made by those skilled in the art, particularly in light of the foregoing teachings. It is therefore contemplated that the appended claims cover such modifications as incorporate those features which come within the scope of the invention.

What is claimed is:

1. A fuel processing method comprising the sequential steps of:
   (a) supplying a feed stream to a primary fuel processing reactor;
   (b) processing said feed stream in said primary fuel processing reactor to produce a first reformate stream comprising hydrogen;
   (c) supplying said first reformate stream to a hydrogen separator and separating said first reformate stream therein into a first hydrogen-rich stream and a first retentate stream;
   (d) supplying said first retentate stream to a secondary fuel processing reactor and processing said first retentate stream therein to produce a second reformate stream comprising hydrogen; and
   (e) supplying said second reformate stream to a hydrogen separator and separating said second reformate stream therein into a second hydrogen-rich stream and a second retentate stream.

2. The method of claim 1 wherein said first and second reformate streams are supplied to the same hydrogen separator.

3. The method of claim 1 wherein said first reformate stream is supplied to a first hydrogen separator in step (c), and said second reformate stream is supplied to a second hydrogen separator in step (e).

4. The method of claim 1 wherein said primary fuel processing reactor is selected from the group consisting of steam reformers, partial oxidation reformers, catalytic partial oxidation reformers, autothermal reformers, and plasma reformers.

5. The method of claim 1 wherein said secondary fuel processing reactor is selected from the group consisting of steam reformers, partial oxidation reformers, catalytic partial oxidation reformers, autothermal reformers, plasma reformers, and shift reactors.

6. The method of claim 1 wherein said feed stream comprises synthesis gas or a reformate stream from a high-temperature reformer, and wherein said primary and secondary fuel processing reactors are shift reactors.

7. The method of claim 1 wherein said primary fuel processing reactor is a steam reformer.

8. The method of claim 7 wherein said secondary fuel processing reactor is a steam reformer or a shift reactor.

9. The method of claim 3 wherein said first and second hydrogen separators comprise membranes independently selected from the group consisting of palladium membranes, palladium alloy membranes, platinum membranes, platinum alloy membranes, titanium alloy membranes, ceramic membranes, zeolite molecular sieve membranes, carbon molecular sieve membranes, inorganic poly-acid membranes, and composite membranes thereof, and wherein said membranes of said first and second hydrogen separators can be the same or different.

10. The method of claim 9 wherein said membranes comprise palladium membranes or palladium alloy membranes.

11. The method of claim 10 wherein said membranes are supported.

12. The method of claim 1 wherein said feed stream is selected from the group consisting of gasoline, diesel, natural gas, ethane, butane, light distillates, dimethyl ether, methanol, ethanol, propane, naptha, kerosene, and combinations thereof.

13. The method of claim 12 wherein said fuel is methanol.

14. The method of claim 1 wherein step (a) further comprises supplying water vapor to said primary fuel processing reactor.

15. The method of claim 1 wherein step (d) further comprises supplying water vapor to said secondary fuel processing reactor.

16. The method of claim 1 wherein step (a) further comprises supplying oxidant to said primary fuel processing reactor.

17. The method of claim 1 wherein step (d) further comprises supplying oxidant to said secondary fuel processing reactor.

* * * * *